(12) United States Patent
Girrell et al.

(10) Patent No.: US 10,364,665 B2
(45) Date of Patent: Jul. 30, 2019

(54) METHOD AND APPARATUS FOR STRESS MAPPING OF PIPELINES AND OTHER TUBULARS

(71) Applicant: Microline Technology Corporation, Traverse City, MI (US)

(72) Inventors: Bruce I. Girrell, Traverse City, MI (US); Dean M. Vieau, Traverse City, MI (US); Johana M. Chirinos, Traverse City, MI (US); Douglas W. Spencer, Rapid City, MI (US)

(73) Assignee: QUANTA ASSOCIATES, L.P., Houston, TX (US)

( * ) Notice: Subject to any disclaimer, the term of this patent is extended or adjusted under 35 U.S.C. 154(b) by 73 days.

(21) Appl. No.: 15/652,879

(22) Filed: Jul. 18, 2017

(65) Prior Publication Data

US 2018/0023384 A1    Jan. 25, 2018

Related U.S. Application Data

(60) Provisional application No. 62/364,028, filed on Jul. 19, 2016.

(51) Int. Cl.
| | |
|---|---|
| *E21B 47/00* | (2012.01) |
| *G01L 1/12* | (2006.01) |
| *E21B 47/09* | (2012.01) |
| *E21B 47/12* | (2012.01) |
| *G01M 5/00* | (2006.01) |

(Continued)

(52) U.S. Cl.
CPC ...... *E21B 47/0006* (2013.01); *E21B 47/0002* (2013.01); *E21B 47/09* (2013.01); *E21B 47/12* (2013.01); *G01L 1/12* (2013.01); *G01M 5/0058* (2013.01); *G01M 5/0091* (2013.01); *E21B 17/1078* (2013.01); *E21B 2023/008* (2013.01)

(58) Field of Classification Search
CPC .................................................. E21B 47/0006
USPC ............................................................. 702/6
See application file for complete search history.

(56) References Cited

U.S. PATENT DOCUMENTS

| | | |
|---|---|---|
| 2,814,019 A | 11/1957 | Bender |
| 3,667,035 A | 5/1972 | Slichter |
| (Continued) | | |

OTHER PUBLICATIONS

Pavlina et al., "Correlation of Yield Strength and Tensile Strength with Hardness for Steels," ASM International, vol. 17(6), Dec. 2008.

(Continued)

*Primary Examiner* — Hien D Khuu
(74) *Attorney, Agent, or Firm* — Honigman LLP

(57) ABSTRACT

A stress mapping system and method is operable to determine and map stresses along a conduit. The system includes a tool movable along a conduit and having at least one sensing device for sensing characteristics of the conduit, and a processor operable to process an output of the at least one sensing device. Responsive to processing of the output by the processor, the processor is operable to determine stresses at a surface of the conduit. Responsive to the processing of the output of the at least one sensing device, and responsive to a determination of a location or position of the tool along the conduit, the system generates a map of determined stresses along the conduit. The map of determined stresses provides a visual representation of the stresses determined at and along the surface of the conduit.

22 Claims, 8 Drawing Sheets

(51) Int. Cl.
*E21B 17/10* (2006.01)
*E21B 23/00* (2006.01)

(56) References Cited

U.S. PATENT DOCUMENTS

| | | |
|---|---|---|
| 3,942,373 A | 3/1976 | Rogers |
| 3,994,163 A | 11/1976 | Rogers |
| 4,105,071 A | 8/1978 | Nicolas et al. |
| 4,207,765 A | 6/1980 | Kiff |
| 4,351,186 A | 9/1982 | Moulin |
| 4,352,065 A | 9/1982 | Rogachev et al. |
| 4,408,160 A | 10/1983 | King et al. |
| 4,444,050 A | 4/1984 | Revett |
| 4,543,827 A | 10/1985 | Tominaga et al. |
| 4,708,204 A | 11/1987 | Stroud |
| 4,719,803 A | 1/1988 | Capelle et al. |
| 4,766,764 A | 8/1988 | Trevillion |
| 4,966,234 A | 10/1990 | Whitten |
| 5,004,724 A | 4/1991 | De |
| 5,166,613 A | 11/1992 | Perry |
| 5,172,480 A | 12/1992 | Labuc et al. |
| 5,313,405 A | 5/1994 | Jiles et al. |
| 5,375,476 A | 12/1994 | Gray |
| 5,520,245 A | 5/1996 | Estes |
| 5,532,587 A | 7/1996 | Downs et al. |
| 5,537,035 A | 7/1996 | Fowler et al. |
| 5,619,135 A | 4/1997 | Kohn et al. |
| 5,720,345 A | 2/1998 | Price et al. |
| 5,828,211 A | 10/1998 | Scruby et al. |
| 6,133,731 A | 10/2000 | Melamud et al. |
| 6,243,657 B1 | 6/2001 | Tuck et al. |
| 6,288,535 B1 | 9/2001 | Chass |
| 6,523,428 B2 | 2/2003 | Kaji |
| 6,583,617 B2 | 6/2003 | LeVert et al. |
| 6,851,476 B2 | 2/2005 | Gray et al. |
| 6,854,336 B2 | 2/2005 | Buttle |
| 6,904,806 B2 | 6/2005 | Pryor |
| 6,924,640 B2 | 8/2005 | Fickert et al. |
| 7,038,444 B2 | 5/2006 | Crouch et al. |
| 7,116,182 B2 | 10/2006 | Varsamis et al. |
| 7,128,988 B2 | 10/2006 | Lambeth |
| 7,141,968 B2 | 11/2006 | Hibbs et al. |
| 7,150,317 B2 | 12/2006 | Barolak et al. |
| 7,159,470 B2 | 1/2007 | Saguto |
| 7,259,555 B2 | 8/2007 | Nummila et al. |
| 7,403,000 B2 | 7/2008 | Barolak et al. |
| 7,443,168 B2 | 10/2008 | Gold et al. |
| 7,454,657 B2 | 11/2008 | Duron et al. |
| 7,595,636 B2 | 9/2009 | Barolak et al. |
| 7,660,197 B2 | 2/2010 | Barolak |
| 7,795,864 B2 | 9/2010 | Barolak et al. |
| 8,035,374 B1 | 10/2011 | Girrell et al. |
| 8,760,638 B2 | 6/2014 | Imai et al. |
| 8,797,033 B1 * | 8/2014 | Girrell ............... E21B 47/0006 324/309 |
| 8,913,251 B2 | 12/2014 | Tin |
| 8,941,821 B2 | 1/2015 | Coupe et al. |
| 9,134,121 B2 | 9/2015 | Tin et al. |
| 9,170,194 B2 | 10/2015 | Ichizawa et al. |
| 2002/0024337 A1 | 2/2002 | Levert et al. |
| 2004/0113627 A1 | 6/2004 | West et al. |
| 2009/0003130 A1 | 1/2009 | Barolak |
| 2010/0179413 A1 | 7/2010 | Kadour et al. |
| 2012/0143522 A1 | 6/2012 | Chen et al. |
| 2012/0143523 A1 | 6/2012 | Chen et al. |
| 2012/0143525 A1 | 6/2012 | Chen et al. |
| 2013/0335745 A1 | 12/2013 | Sano |
| 2016/0231277 A1 | 8/2016 | Molenda et al. |

OTHER PUBLICATIONS

Amend, "Using Hardness to Estimate Pipe Yield Strength; Field Application of ASME CRTD—vol. 91," Proceedings of the 2012 9th International Pipeline Conference IPC2012, Sep. 24-28, 2012, Calgary, Alberta, Canada.

* cited by examiner

Exemplar of a Tool with Multiple Modules within a Tubular with Robotic Crawling Propulsion Capabilities Exemplar of a Tool with Multiple Modules within a Tubular with Push and/or Pull Propulsion Capabilities

METHOD AND APPARATUS FOR STRESS MAPPING OF PIPELINES AND OTHER TUBULARS

CROSS REFERENCE TO RELATED APPLICATION

The present application claims the filing benefits of U.S. provisional application, Ser. No. 62/364,028, filed Jul. 19, 2016, which is hereby incorporated herein by reference in its entirety.

FIELD OF THE INVENTION

The present invention relates generally to a method of detecting stresses in a pipeline or conduit or tubular via a tool or device that is moved along and within the pipeline or conduit or tubular.

BACKGROUND OF THE INVENTION

It is known to use a sensing device to sense or determine the strength of and/or freepoints and/or stresses in pipes and other tubulars. Examples of such devices are described in U.S. Pat. Nos. 4,708,204; 4,766,764; 8,035,374 and/or 8,797,033.

SUMMARY OF THE INVENTION

The present invention provides a stress mapping method and system and device that includes moving a tool or instrument along and within a pipe or well casing or conduit or tubular to collect data, and processing collected data to determine stresses in the walls of the pipe or conduit or tubular. The stress mapping system includes a tool that is movable along a conduit and that has at least one sensing device for sensing characteristics of the conduit. A processor is operable to process an output of the sensing device(s) and, responsive to processing of the output by the processor, the processor is operable to determine stresses in the conduit. Responsive to such processing, and responsive to a determination of a location or position of the tool along the conduit, the system maps the determined stresses along the conduit. Optionally, the sensing device may be operable to sense magnetic Barkhausen noise (MBN), whereby the processor, via processing of the MBN data, determines the stresses in and/or along the conduit or pipeline or tubular. Alternatively, or additionally, other sensing methods may be utilized to determine the stresses in and/or along the conduit or pipeline or tubular, while remaining within the spirit and scope of the present invention.

These and other objects, advantages, purposes and features of the present invention will become apparent upon review of the following specification in conjunction with the drawings.

DESCRIPTION OF THE PREFERRED EMBODIMENTS

The present invention provides a system and method and apparatus for determining stresses in ferromagnetic pipelines or well casings, and other ferromagnetic tubulars or conduits. The tool can be operated in pipelines (e.g., inline inspection), downhole applications (drill strings, well casing and tubing), and other tubulars for the purpose of stress determination in the conduit walls (such as steel or type/grade of steel or the like).

Magnetic Barkhausen Noise (MBN) methods have long been used to measure stress levels within materials of interest. Additionally, MBN methods have been used to determine hard spots in sheets of steel within mills, as well as evaluating case hardening of items such as gears.

In accordance with the present invention, MBN methods and apparatus are used to determine and map the stress state of surfaces of tubulars such as pipelines, well casings, drill strings, and/or the like. This may be accomplished via tools (apparatus) with sensing capabilities that travel along the inside of the tubular. Optionally, tools with sensing capabilities can be constructed to operate along the outside surfaces of the tubulars. Optionally, aspects of the present invention may be utilized to determine stresses on other shaped or formed materials, such as non-tubular forms or flat sheets of material or the like. Thus, while the method of the present invention may inspect tubular products from the inside, similar apparatuses and methods may be employed to inspect the external surfaces of tubulars, sheets and other shapes.

In the case of pipelines, the pipe can be subjected to stresses generated from, but not limited to, manufacturing processes, damage from installation, undermining, tectonic movement, weather related events, slumping, subsidence, corrosion, 3rd parties, and/or the like. Thus, the overall structural health of the tubular can be evaluated by the state of stress to which it is actively subjected. MBN methods are useful in evaluating the stress of the surface or material of interest through mapping of the surface in question to see possible stress concentrations and/or changes in stress that may compromise the tubular.

Figure 1:
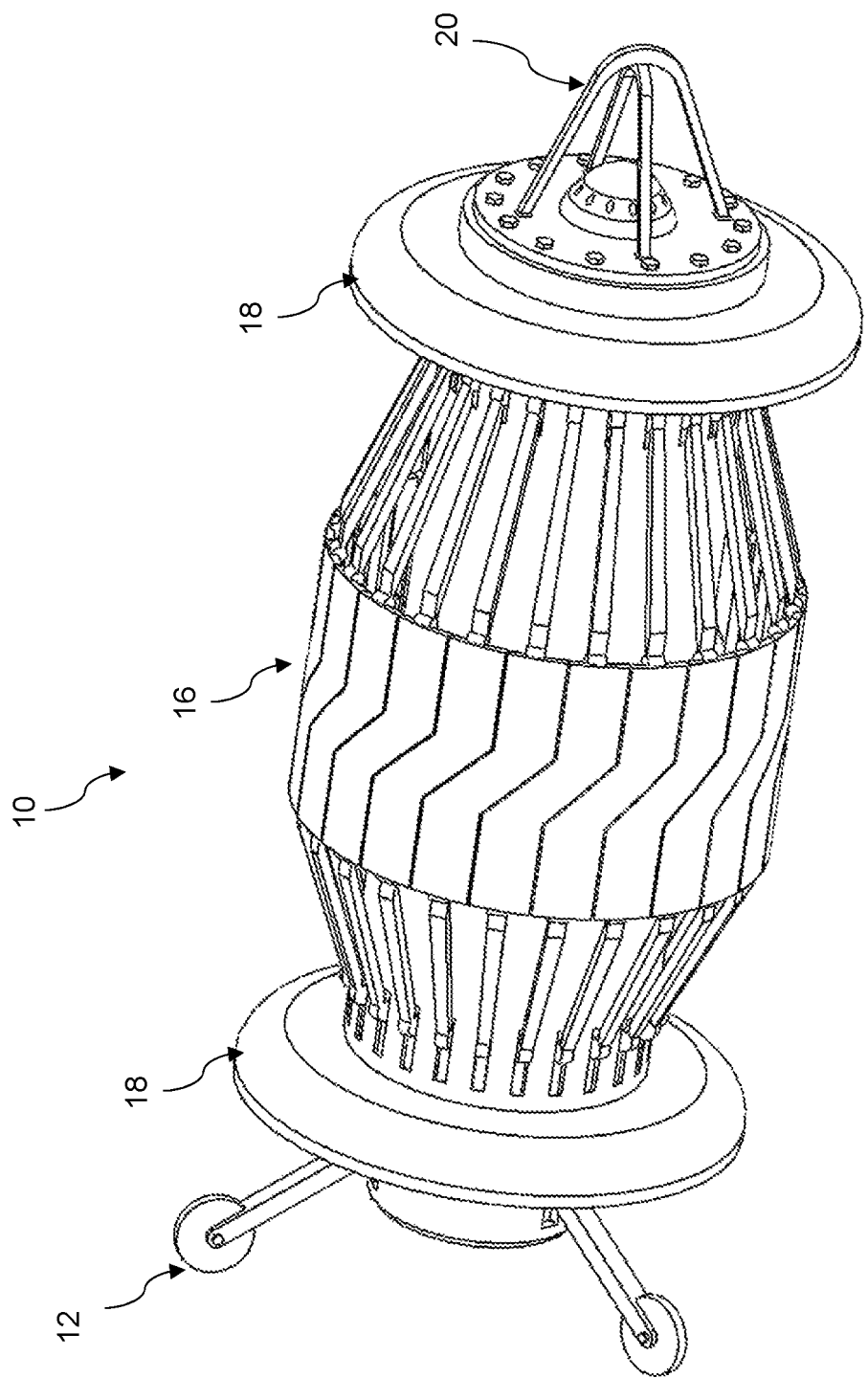
FIG. 1 is a perspective view of a stress mapping tool or module for in-line inspection of a conduit or tubular in accordance with the present invention.
Figure 2:
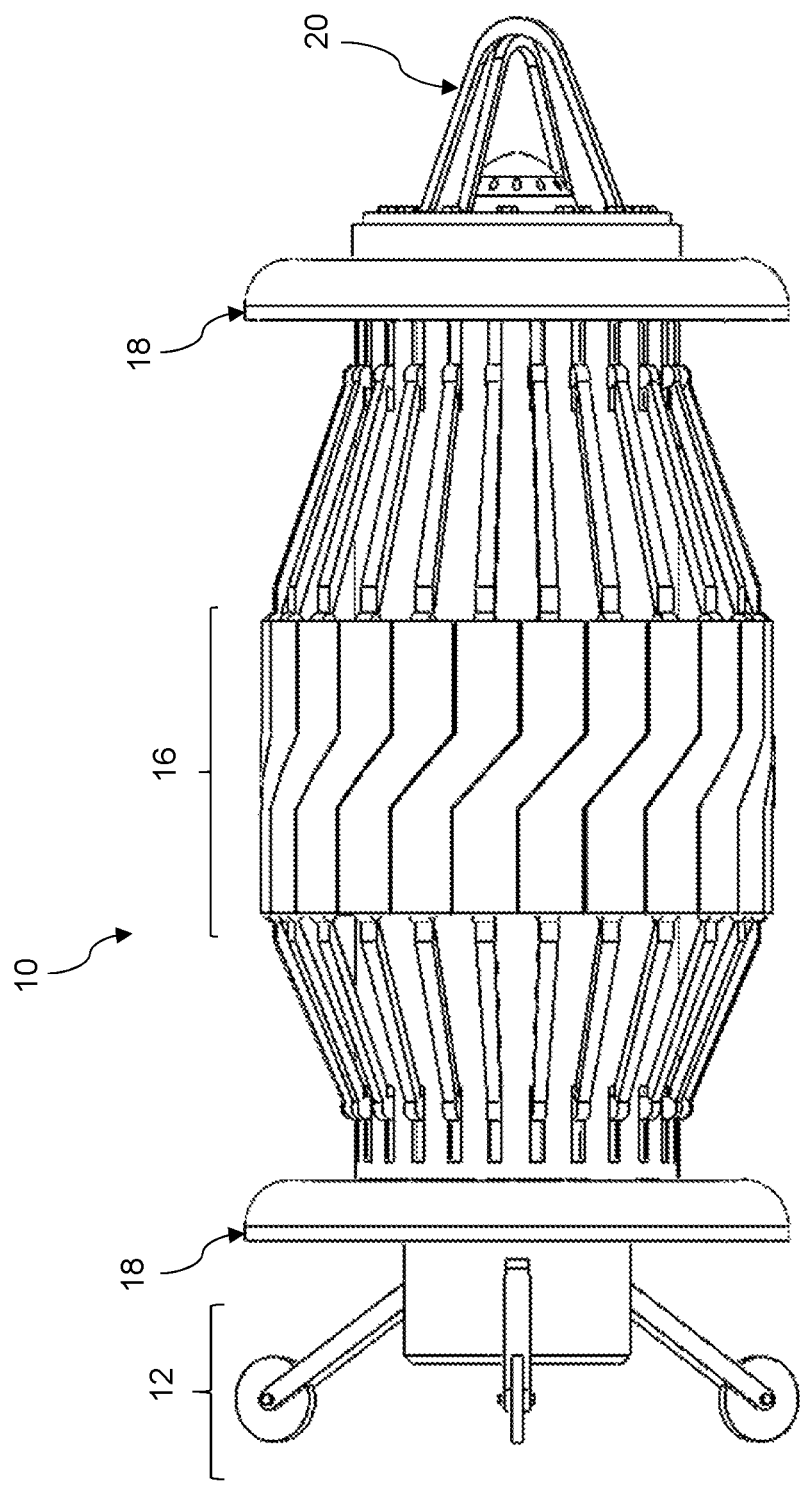
FIG. 2 is a side elevation of the stress mapping tool or module of FIG. 1.
Figure 3:
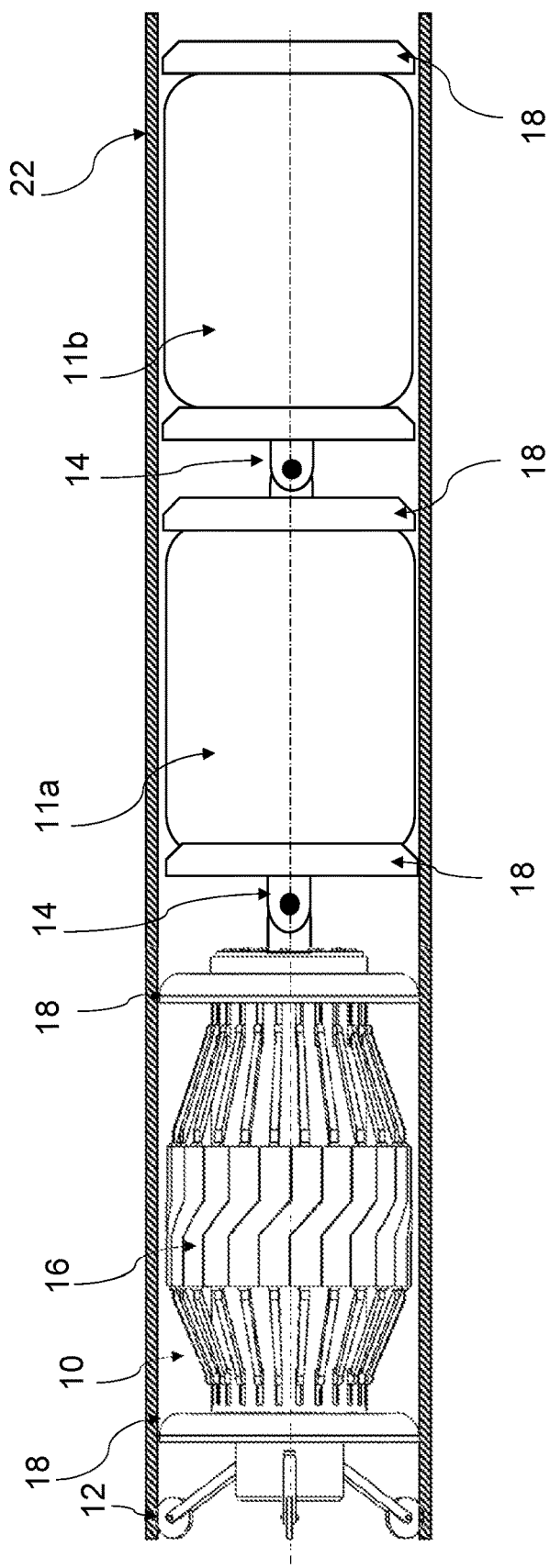
FIG. 3 shows a horizontal cross section of a pipe or tubular with a stress mapping tool of the present invention disposed therein.

The system of the present invention comprises a tool 10 having one or more sensors or devices 16 that detect characteristics (such as MBN) that are indicative of the stresses in and/or along the conduit or tubular (FIGS. 1-3). The system is operable to track the location of the tool in or on the conduit or tubular and to map the stresses determined as the tool moves along the conduit or tubular. The system may map the determined stresses to provide a visual representation of the stresses measured on the entire surface of the inside diameter/bore/wall of the tubular conduit. Optionally, such a visual representation may be provided for stresses at the outside diameter/wall if the stresses are measured from outside of the tubular conduit. The system may map the stresses to provide a two dimensional or three dimensional visual representation of the stresses, whereby a map of determined stresses around the circumference of the conduit or tubular and longitudinally along the conduit or tubular may be generated.

Optionally, a tool with multiple modules (such as shown in FIG. 3) may contain multiple sensing technologies that interact with each other, and/or utilize shared componentry. For example, a tool with multiple modules may include a single sensing technology that interacts between multiple modules, or a tool with multiple modules may include multiple sensing technologies that interact between the multiple modules. In the illustrated embodiment, the stress mapping tool or module 10, including odometers/encoders 12 that determine or track the movement and/or location of the tool(s) along the conduit, is attached (such as via a universal joint 14) at a rear of one or more additional tools or modules 11a, 11b.

As shown in FIGS. 1-3, the tool 10 includes a plurality of sensor shoes 16 at a central region of the tool, with drive cups 18 at or near opposite ends of the tool. The drive cups may comprise centralizers (for keeping the tool centered in the conduit) and/or cleaning rings. In the illustrated embodiment, the tool 10 includes a pull or tow loop or loops 20, which is configured to attach to a cable or other tool or module to pull or move the tool 10 along the conduit.

Figure 7:
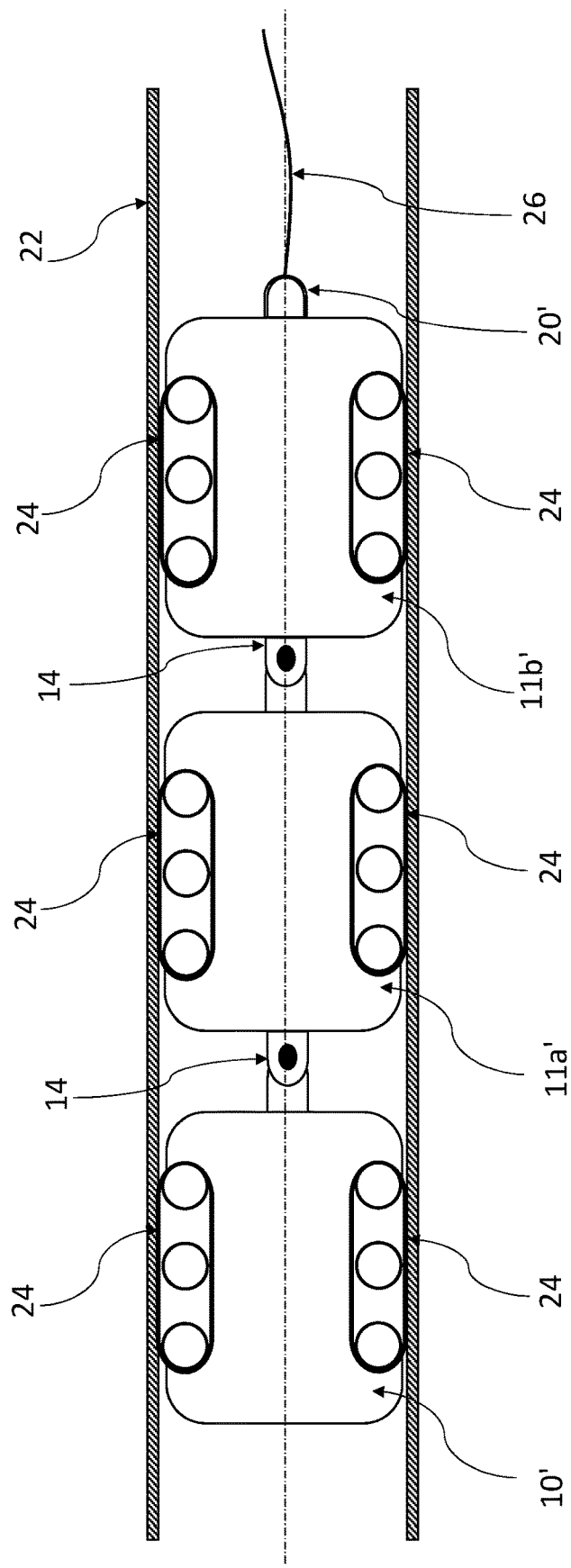
FIG. 7 shows a horizontal cross section of a pipe or tubular with another tool of the present invention disposed therein.
Figure 8:
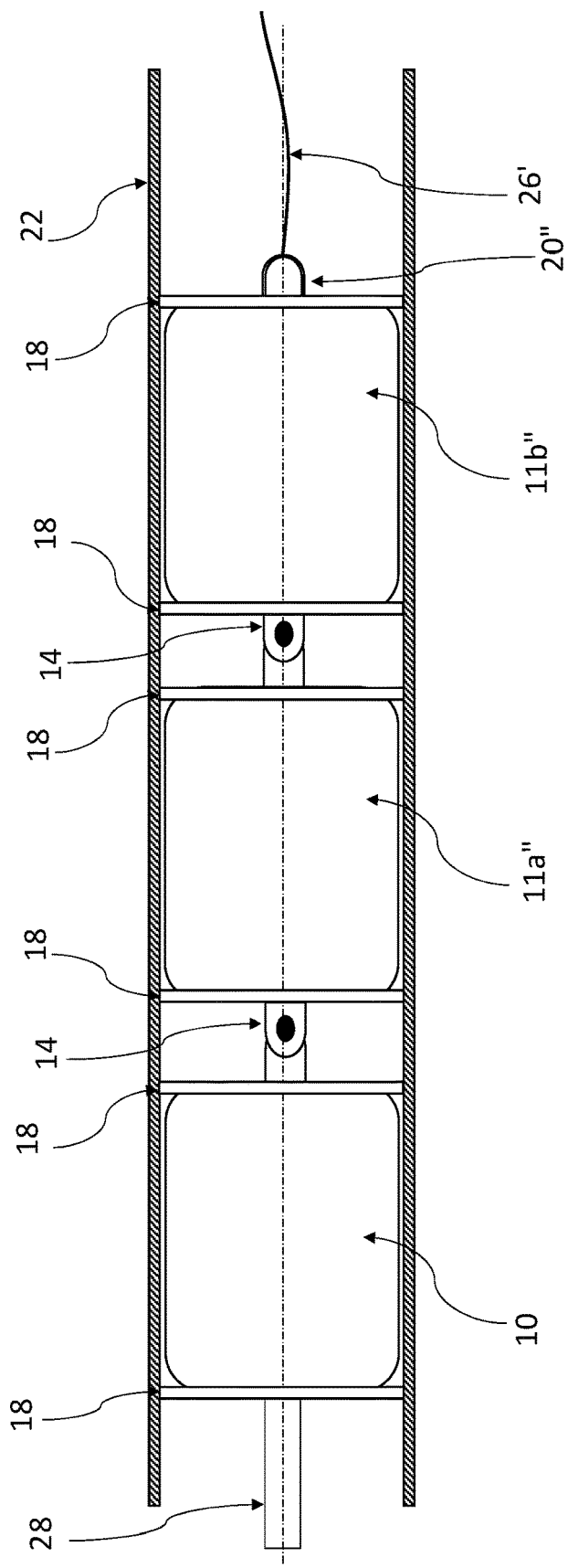
FIG. 8 shows a horizontal cross section of a pipe or tubular with another tool of the present invention disposed therein.

Optionally, and such as shown in FIG. 3, multiple tools 10, 11a, 11b may be attached together (via respective universal joints 14) and moved along and through the conduit or tube 22. The tool or tools are propelled by a gaseous or liquid medium pressure differential (such as with the drive cups 18 or the like as shown in FIGS. 1-3). Optionally, and such as shown in FIG. 7, various tools or modules 10', 11a', 11b' may be used, and the tools may be self-propelled by a electromechanical drive system, such as, for example, a robotic crawler 24, with the tools joined via a universal joint 14, and optionally with the front tool 11b' connected to a cable 26 (such as a pull cable attached at a tow or pull loop 20' at the front tool or module 11b', and/or such as a power cable and/or a communications cable or line or the like). Optionally, and such as shown in FIG. 8, the tools 10'', 11a'', 11b'' may be propelled (pulled) via a cable 26 in tension (such as a cable attached at a pull loop 20'' of the front tool or module 11b''), or may be propelled (pushed) via a pushing or biasing member or element 28, such as a coiled tube in compression (FIG. 8), or may be propelled via any combination of the aforementioned propulsion means. The tool or tools may be powered on-board, remotely, or a combination of both. Optionally, the tool may have a system and method to clean surfaces for better sensing abilities, with the system or method incorporated with at least one module if utilized in the tool.

The tool of the present invention can be operated in pipelines (e.g., inline inspection), downhole applications, and other tubulars for the purpose of stress mapping. The tool utilizes Magnetic Barkhausen Noise means to determine and map stress amplitudes along a tubular's surface, such as a pipeline or a casing. The Magnetic Barkhausen Noise measures residual stresses (such as, for example, from manufacturing processes such as welding or the like), as well as active stresses being generated from current/on-going loading. The Magnetic Barkhausen Noise has the capability of mapping the hardness of the surface (such as, for example, work hardened location vs. an unstressed location). The tool and system may utilize aspects of the systems described in U.S. Pat. Nos. 8,797,033 and/or 8,035,374, which are hereby incorporated herein by reference in their entireties.

Optionally, the tool may utilize other magnetic permeability methods to augment/supplement/complement MBN methods. Optionally, the tool may utilize acoustic methods to augment/supplement/compliment MBN methods or other magnetic permeability techniques. Optionally, the tool may utilize a Giant Magneto-Impedance (GMI) sensor(s) to augment/supplement/compliment MBN methods.

The MBN sensing means utilizes at least one sensor. The tool comprises at least one module for MBN sensing, with each module having at least one sensor. The tool utilizes means for positional and/or spatial relationship via items such as a caliper, encoder, gyroscopic devices, inertial measurement unit (IMU), and the like. Optionally, the tool may also utilize a caliper module for determination of geometry flaws, dents, and the like.

The tool may utilize at least one, or any combination of several sensing technologies (such as MBN, various acoustic techniques, Magnetic Acoustic Emission, and/or the like). The tool may utilize individual sensor(s) or array(s) unlimitedly disposed in uniform or non-uniform arrangements/patterns for the sensing technologies.

The tool may be operable to store data on-board, or the tool may transmit collected data to a remote location for storage (and/or processing), or a combination of both.

The tool employs advanced data processing techniques to isolate and extract useful data as required. The tool employs advanced data processing techniques that use a single sensing technology, or any combination of sensing technologies (together or individually). Data processing may be conducted in real-time during tool operation, off-loaded after completion of a tool operation, or a combination of both.

The tool may comprise at least one module, which may comprise at least one sensing technology. Each module may include multiple sensing technologies that interact with each other, and/or utilize shared componentry. Optionally, a tool with multiple modules (such as shown in FIGS. 3, 7 and 8) may include such multiple sensing technologies that interact with each other and/or utilize shared componentry.

The tool can be operated in a wide variety of diameters or cross-sectional areas of tubulars or pipes or conduits. Optionally, the tool can be attached to other tools (such as, for example, other tools for material identification, crack detection, magnetic flux leakage, calipers, and/or the like).

The tool may simultaneously use the aforementioned sensing technologies with existing tools' sensing capabilities and/or system(s). For example, the stress mapping technologies may utilize crack detection sensing capabilities simultaneously through shared componentry, magnetic fields, perturbation energy, waves, and/or the like).

The tool preferably includes the means to determine the tool's position or location in a conduit or distance from a particular location. For example, the tool may include gyroscopic systems, encoders, and/or the like to determine the location of the tool along the pipe or conduit. The tool includes the means to determine time and/or position/location/distance and may store this data on-board or may transmit the time and/or position/location/distance data to a remote location, or may perform a combination of both. Optionally, and desirably, the tool may combine the time and/or position/location/distance data simultaneously with sensing data collection at any discrete location within the tubular, whereby the system may determine the stresses of the pipe or conduit at specific locations along the pipeline, which is useful in determining where sections of pipe may be over-stressed.

Optionally, a tool of the present invention may be mounted externally to a tubular, such as via a fixture, frame, cabling, or the like, in order to determine and map stresses on the exterior surface(s) of the tubular. Such an exterior mounted tool may have a sensing "suite" that is moved manually, or is powered, or is pre-programmed to operate in a pattern. Similarly, a tool of the present invention may be reconfigured to inspect surfaces and a large variety of shapes.

The tool of the present invention may provide improved downhole application positional management due to increased depth accuracy and precision from aforementioned stress mapping methods and apparatus. The downhole tool may be operated via slicklines and/or wirelines, or other means such as, but not limited to, robotic crawlers or the like.

Figure 5:
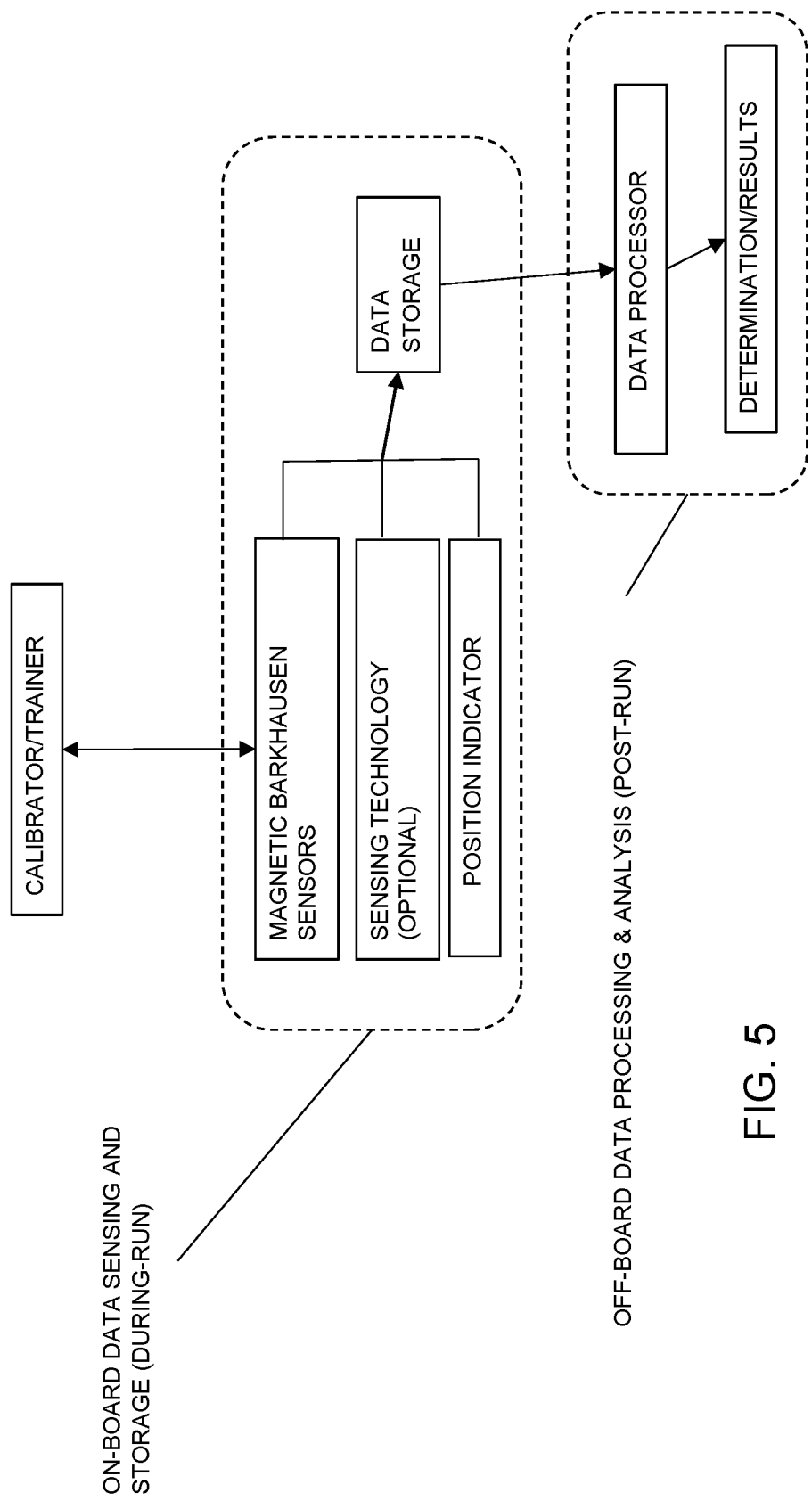
FIG. 5 is a block diagram showing post-run data processing and classifying stages of the system of the present invention.
Figure 6:
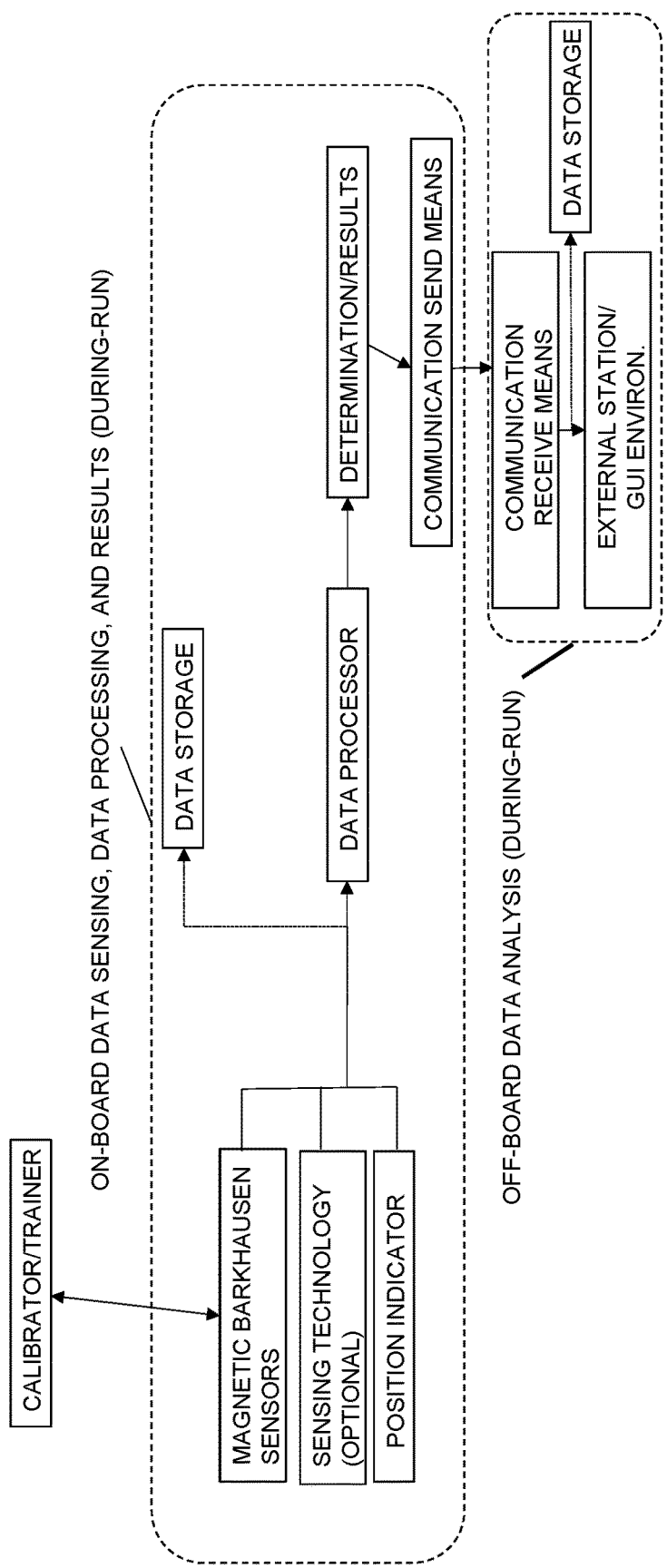
FIG. 6 is another block diagram showing real-time processing and classifying of data in accordance with the present invention.

As shown in FIG. 5, the tool includes on-board data sensing and storage (during the moving of the tool along the conduit), with one or more sensing technologies and optionally with location/distance/position determining and/or indicating systems. As the tool travels along and within the pipe or conduit, the tool collects data via its sensing technology or technologies and stores the data, whereby the stored data may be processed (via a data processor) at an off-board data processing and analysis station or system or process (post-run, after the tool has completed its travel through the pipeline) and classified and analyzed to determine the pipe stresses. Optionally, the tool may include real-time data processing and analysis to determine the pipe stresses as the tool is traveling through the pipeline. For example, and such as shown in FIG. 6, the system may provide real-time or on-board data sensing and data processing, with the data that is collected by the tool's sensing technology or technologies processed (via an on-board data processor) to determine the pipe stresses, whereby the determined stresses or processing results are communicated or transmitted by a transmitter of the tool to a receiver of an off-board data processing and analysis station so the results can be analyzed and displayed (such as at a graphical user interface (GUI) or the like) while the tool is still traveling through the pipeline. In such an embodiment, the processing/analysis software is included in the tool itself, whereby only the determination or results is transmitted or communicated to a remote location (and the communicated results may include the determined stresses and the location along the pipeline associated with the stresses).

Figure 4:
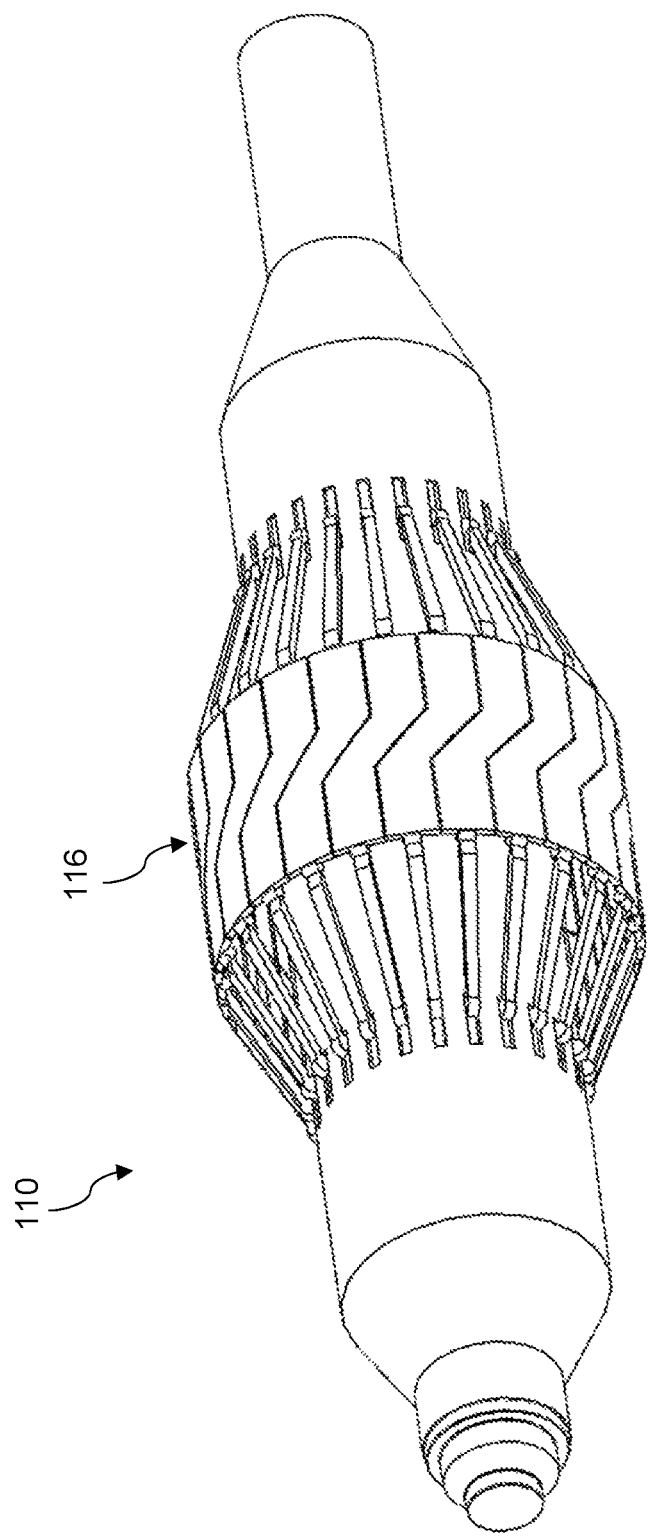
FIG. 4 is a perspective view of a stress mapping tool or module for downhole applications in accordance with the present invention.

Optionally, a tool or module of the present invention may be suitable for use in a downhole application, where the tool or module is lowered (and raised) along a downhole tubular or conduit. For example, and such as shown in FIG. 4, a tool 110 includes a plurality of sensor shoes 116 that are operable to sense stresses in the conduit as the tool is moved along the conduit, such as in a similar manner as discussed above. The system includes positioning determining means that determines the position of the tool along the downhole. For example, the tool may include a device that determines the position along the conduit (such as a conduit contacting device or a non-contacting elevation determining device or the like) or the system may determine the location by monitoring movement of a cable that lowers and raises the tool in the conduit. The system correlates the stress data collected by the sensing device with the position data determined or sensed by the position determining device to generate a stress map of stresses along the conduit.

The tool of the present invention may include calibrating means, such as a device and/or system to zero-out or reset the sensors to a null value at time equals zero. The calibration device may reside internally or externally to the stress mapping module/tool. The tool also includes sensing means, including MBN sensors (and optionally one or more other sensor technologies, such as eddy current sensing, pulsed eddy current sensing and/or the like.). The tool also includes positional indication means for determining the movement and/or position of the tool along the pipe or conduit. For example, the position determining device may comprise an odometer or an encoder or calipers, or IMU or gyroscopic devices or the like.

The tool includes propulsion means for moving the tool along the conduit. For example, the tool or system may include cables, wirelines/slicklines, pressure differential cups, self-propelled devices (such as, for example, robotic crawlers or the like), coiled-tubing, etc.

The tool is movable along the conduit and senses the location of the tool and senses stresses in the conduit, so that the determined stresses can be correlated to the location at which they are sensed. The tool includes data storage means (part of the tool, and/or external to the tool), such as hard drives (steady-state, etc.), memory, and/or other peripheral devices or the like. The system's data processor or data processing/evaluation means (part of the tool, and/or external to the tool) may comprise a microprocessor or computer or network or other peripheral devices or the like.

The tool includes communications means, such as a transmitter (at the tool) and receiver (remote from the tool) and/or such as a wireline or wired link. The communication means or system is operable to send and receive data (either pre-processed data for external processing or post-processed data when data is processed real-time at the tool), and may include hardware and software at the tool for processing the collected data and transmitting the processed data or information or results, such as for external real-time results review.

The system includes a device for displaying or communicating the determined stresses and locations to an analyst. For example, the determination/results may be displayed at a GUI (such as via one or more computers, apps (such as at a computer or smartphone or mobile device), external station and/or the like).

Optionally, the system may comprise a train of tool bodies (modules) having multiple tool bodies attached to one another. Optionally, each tool body or module may be operable to perform other tasks, measurements or the like. Optionally, the tool or system may comprises a demagnetizer located at the beginning of a train of tool modules.

The tool is configured to be operated in gaseous and/or liquid environments. For example, the tool may be configured to move along a conduit or pipeline or tubular that conveys air, oil, natural gas, water or any other gaseous or liquid medium.

Thus, the system or method of the present invention comprises a tool or module that includes MBN sensing technology and a position indicator or motion indicator or the like. Prior to use of the tool in a conduit, the MBN sensor(s) are calibrated (zeroed out) to material in a completely unstressed state (zero to very low residual stresses). The tool is conveyed into a tubular (such as a pipeline, downhole, piping, etc.). Optionally, the tool may be configured to be mounted externally to and movable along an external surface of a tubular (if an external stress map is the desired goal). The position indicator(s) (such as an encoder, inertial measurement unit (IMU), gyroscopic devices, calipers, and/or the like) begin indicating position as tool travels (such as via engaging a surface of the tubular or via other non-contacting means). The MBN sensor(s) (and/or any optional additional sensing means) start measuring or sensing as the tool travels in the tubular. The MBN sensor(s) measurements (and/or additional sensing means) are made around the circumference/inner wall of the inner bore of the tubular at desired axial increments (sample rate). The measurements (such as stress data collected by a controller or processor of the tool responsive to an output of the sensor or sensors) are stored in a data storage device, and the data may be later extracted from the device (and/or communicated in real-time to an operator or analyst, with optional external data storage). Position information (such as data collected by a controller or processor of the tool responsive to outputs of a position determining device) is also stored in the data storage device, with the stress data correlated with the position data).

Optionally, each MBN sensor measurement (and/or additional sensing means) may be converted into a relative stress value, and the stress values are mapped to the tubular around the circumference and along the length via a function of the value to the determined or indicated discrete position of the tool at which the value was sensed. The stress map may be viewed either in lists/tables of detailed stress values versus indicated discrete position or via a GUI and/or app that displays stress contours to an operator or analyst.

Optionally, the tool or method or system may conduct a baseline run of the tubular that will be tested in repeated intervals over time (to determine relative deterioration and/or stresses beyond initial). The baseline data may be stored such that future runs can be compared to the baseline to determine changes over time.

Optionally, the tool or method or system may correlate the position and deformation measurements from the position indicators (encoder, IMU, gyroscopic devices, etc.) to the MBN measurements. For example, the system may correlate position and deformation measurements by correlating MBN measurements to where a pipe slumps in the ground, or where there is more cross-section ovality or where there is a dent. This can aid in correlating/reaffirming MBN measurement output to stress magnitudes.

Therefore, the present invention provides a tool or device that utilizes one or more sensing systems or devices or means to sense and collect data pertaining to stresses in the pipe or conduit in which the tool is disposed. The collected data is processed and analyzed to determine the stresses in the pipe at various locations along the conduit or pipeline. Thus, the system and method of the present invention can determine stresses and map the stresses along the pipeline or conduit.

Changes and modifications to the specifically described embodiments may be carried out without departing from the principles of the present invention, which is intended to be limited only by the scope of the appended claims as interpreted according to the principles of patent law including the doctrine of equivalents.

The invention claimed is:

1. A stress mapping system operable to determine and map stresses along a conduit, said stress mapping system comprising:
   a tool movable along a conduit and having at least one sensing device for sensing characteristics of the conduit;
   wherein said tool includes a position determining device operable to determine the position of said tool as said tool moves along the conduit;
   a processor operable to process an output of said at least one sensing device;
   wherein, responsive to processing of the output by said processor, said processor is operable to determine stresses at a surface of the conduit;
   wherein, responsive to determining the position of the tool, said processor determines a position of deformations of the conduit;
   wherein, responsive to determining stresses at the surface of the conduit and determining the position of deformations of the conduit, said processor correlates determined stresses at the surface of the conduit with the determined position of deformations of the conduit;
   wherein, responsive to correlating the determined stresses at the surface of the conduit with the determined position of deformations of the conduit, said processor affirms the determined stresses at the surface of the conduit;
   wherein, responsive to said processing of said output of said at least one sensing device, and responsive to determination of the position of said tool along said conduit, said system generates a map of determined stresses along the conduit; and
   wherein the map of determined stresses provides a visual representation of the stresses determined at and along the surface of the conduit.

2. The stress mapping system of claim 1, wherein said tool comprises at least one module with each module having at least one sensing device.

3. The stress mapping system of claim 1, wherein said tool comprises at least two modules with each module having a respective sensing device.

4. The stress mapping system of claim 3, wherein one of said sensing devices comprises a sensing device that senses Magnetic Barkhausen Noise, and wherein a lead module of said at least two modules comprises a demagnetizer.

5. The stress mapping system of claim 1, wherein said at least one sensing device comprises at least two sensing devices using different sensing technologies.

6. The stress mapping system of claim 1, wherein said at least one sensing device comprises a sensing device that senses Magnetic Barkhausen Noise.

7. The stress mapping system of claim 1, wherein said processor processes the output of said at least one sensing device to determine the stresses at an interior surface of the conduit.

8. The stress mapping system of claim 1, wherein said processor processes the output of said at least one sensing device to determine the stresses at an exterior surface of the conduit.

9. The stress mapping system of claim 1, wherein said tool is operable to calibrate said at least one sensing device to a null value at a start time and start position of said tool.

10. The stress mapping system of claim 1, wherein said processor is disposed at said tool, and wherein said tool comprises a transmitter for transmitting determined stresses and positions to a remote receiver.

11. The stress mapping system of claim 1, wherein said processor is disposed at a remote location, and wherein said tool comprises a transmitter for transmitting stress data output by said at least one sensing device and position data output by said positioning determining device to a receiver at the remote location.

12. The stress mapping system of claim 1, wherein said tool comprises data storage for storing stress data output by said at least one sensing device and position data output by said positioning determining device, and wherein said processor is disposed at a remote location for processing the stored data after said tool has completed a run along the conduit.

13. The stress mapping system of claim 1, wherein said tool is movable along the conduit via a propulsion system selected from the group consisting of (i) a pull cable attached at said tool for pulling said tool along the conduit, (ii) a push member for pushing said tool along the conduit, (iii) pressure differential cups at said tool, and (iv) robotic crawler devices at said tool.

14. A method for determining and mapping stresses along a conduit, said method comprising:
provSiding a tool having a sensing device and a position determining device;
moving the tool along a conduit and determining stresses at a surface of the conduit as the tool moves along the conduit;
determining the position of the tool as the tool moves along the conduit;
determining a position of deformations of the conduit based on the determined position of the tool;
correlating the determined stresses at the surface of the conduit with the determined position of deformations of the conduit;
affirming the determined stresses at the surface of the conduit based on the correlation between the determined stresses at the surface of the conduit and the determined position of deformations of the conduit; and
mapping the determined stresses along the conduit, wherein the mapped determined stresses provide a visual representation of the stresses determined at and along the surface of the conduit.

15. The method of claim 14, wherein the sensing device senses Magnetic Barkhausen Noise as the tool moves along the conduit.

16. The method of claim 14, wherein the step of determining stresses comprises collecting data indicative of stresses around an inner wall of the conduit at selected axial increments.

17. The method of claim 14, comprising storing stress data and position data in a data storage device of the tool.

18. The method of claim 14, comprising transmitting stress data and position data to a remote receiver, wherein mapping the determined stresses along the conduit is performed by a device at the remote receiver location.

19. The method of claim 14, wherein mapping the determined stresses comprises converting determined stresses into relative stress values and mapping the relative stress values around a circumference of the conduit and along the length of the conduit via a function of the relative stress values to the correlated positions.

20. The method of claim 19, comprising displaying the mapped determined stresses at a display device remote from the tool.

21. The method of claim 14, wherein moving the tool along the conduit comprises making an initial pass of the tool along the conduit and making subsequent passes of the tool along the conduit, and wherein said method comprises comparing the mapped determined stresses of subsequent passes of the tool along the conduit with the mapped determined stresses of the initial pass of the tool along the conduit.

22. The method of claim 14, wherein the deformations of the conduit include one or more of (i) an area where the conduit slumps in the ground, (ii) an area where there is more cross-section ovality of the conduit and (iii) an area where there is a dent in the surface of the conduit.

* * * * *